No. 870,387. PATENTED NOV. 5, 1907.
B. SCHNEIDER.
FARE INDICATOR.
APPLICATION FILED SEPT. 12, 1906.

6 SHEETS—SHEET 1.

Witnesses:

Inventor
Berthold Schneider
By
James L. Norris.
Atty.

No. 870,387. PATENTED NOV. 5, 1907.
B. SCHNEIDER.
FARE INDICATOR.
APPLICATION FILED SEPT. 12, 1906.

6 SHEETS—SHEET 2.

Witnesses:

Inventor
Berthold Schneider
By
James L. Norris.
Atty.

No. 870,387.

PATENTED NOV. 5, 1907.

B. SCHNEIDER.
FARE INDICATOR.
APPLICATION FILED SEPT. 12, 1906.

6 SHEETS—SHEET 3.

Witnesses

Inventor
Berthold Schneider
By
James L. Norris
Atty

No. 870,387.

PATENTED NOV. 5, 1907.

B. SCHNEIDER.
FARE INDICATOR.
APPLICATION FILED SEPT. 12, 1906.

6 SHEETS—SHEET 5.

Witnesses.

Inventor
Berthold Schneider
By
James L. Norris.
Atty

No. 870,387.

PATENTED NOV. 5, 1907.

B. SCHNEIDER.
FARE INDICATOR.
APPLICATION FILED SEPT. 12, 1906.

UNITED STATES PATENT OFFICE.

BERTHOLD SCHNEIDER, OF BERLIN, GERMANY.

FARE-INDICATOR.

No. 870,387.  Specification of Letters Patent.  Patented Nov. 5, 1907.

Application filed September 12, 1906. Serial No. 334,312.

*To all whom it may concern:*

Be it known that I, BERTHOLD SCHNEIDER, engineer, a citizen of the Empire of Germany, and resident of 101-102 Bernauerstrasse, Berlin, Germany, have made certain new and useful Improvements in Cab-Fare Indicators, of which the following is a specification.

This invention relates to fare indicators for traveling vehicles, and the object thereof is to provide the indicator with means, in a manner as hereinafter set forth to constitute a check for preventing tampering with the distance-indicating mechanism; further to provide the indicator with means, in a manner as hereinafter set forth, to prevent the adjustment of the indicator to other than full fare, and to provide the indicator with means in a manner as hereinafter set forth to prevent any accidental adjustment of the mechanism.

Further objects of the invention are to provide a fare indicator for traveling vehicles which shall be simple in its construction, strong, durable, accurate, efficient in its use, readily attached to the vehicle and comparatively inexpensive to manufacture.

With the foregoing and other objects in view, the invention consists of the novel construction, combination and arrangement of parts hereinafter more specifically described and illustrated in the accompanying drawings wherein is shown the preferred embodiment of the invention.

The accompanying drawings illustrate a fare-indicator in accordance with this invention.

Figure 1:
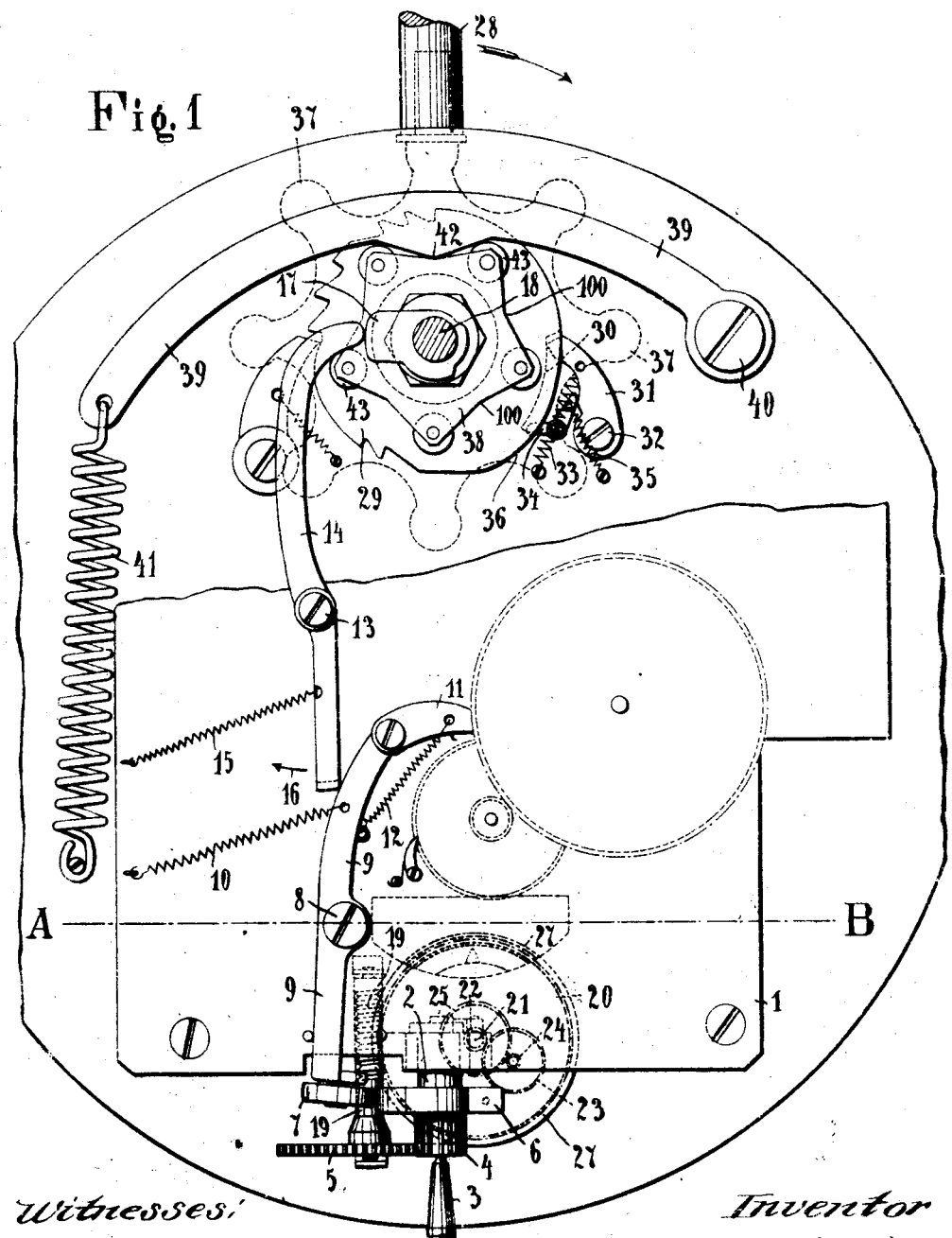
Figure 2:
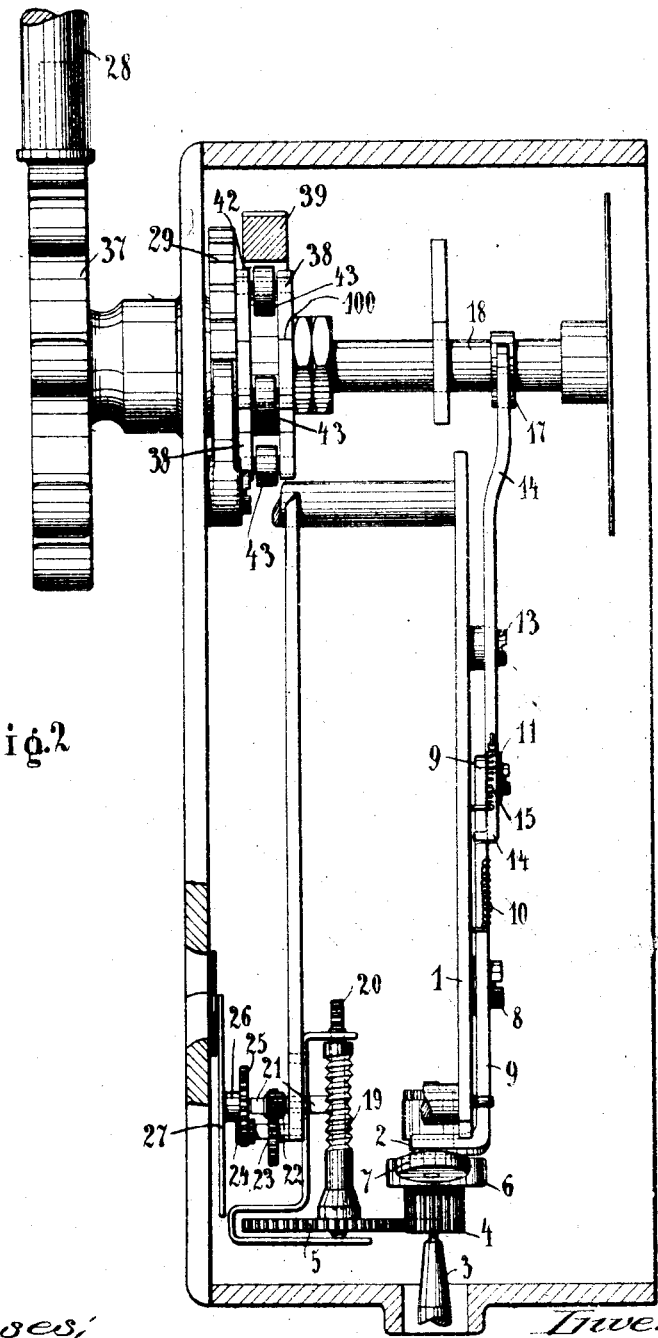
Figure 3:
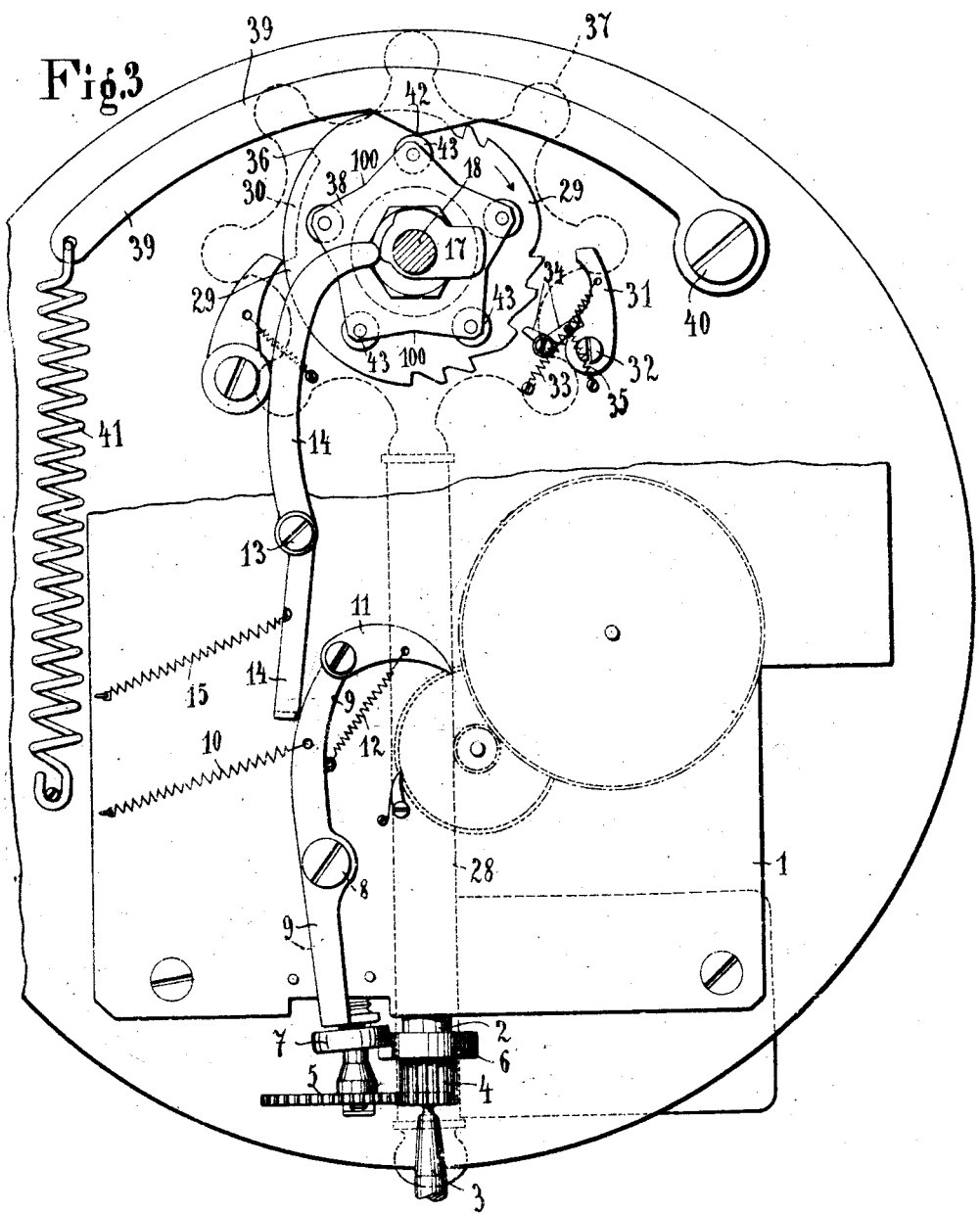
Figure 4:
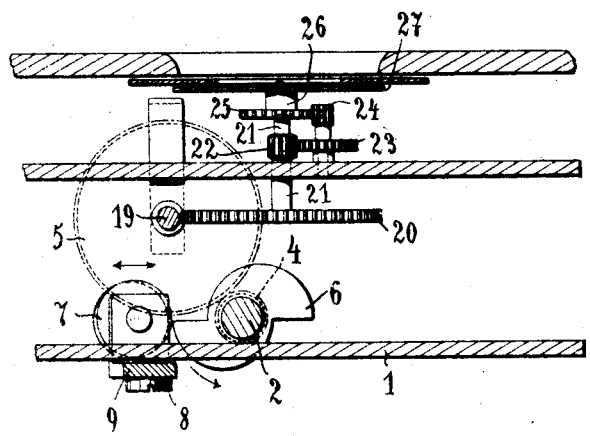
Figure 5:
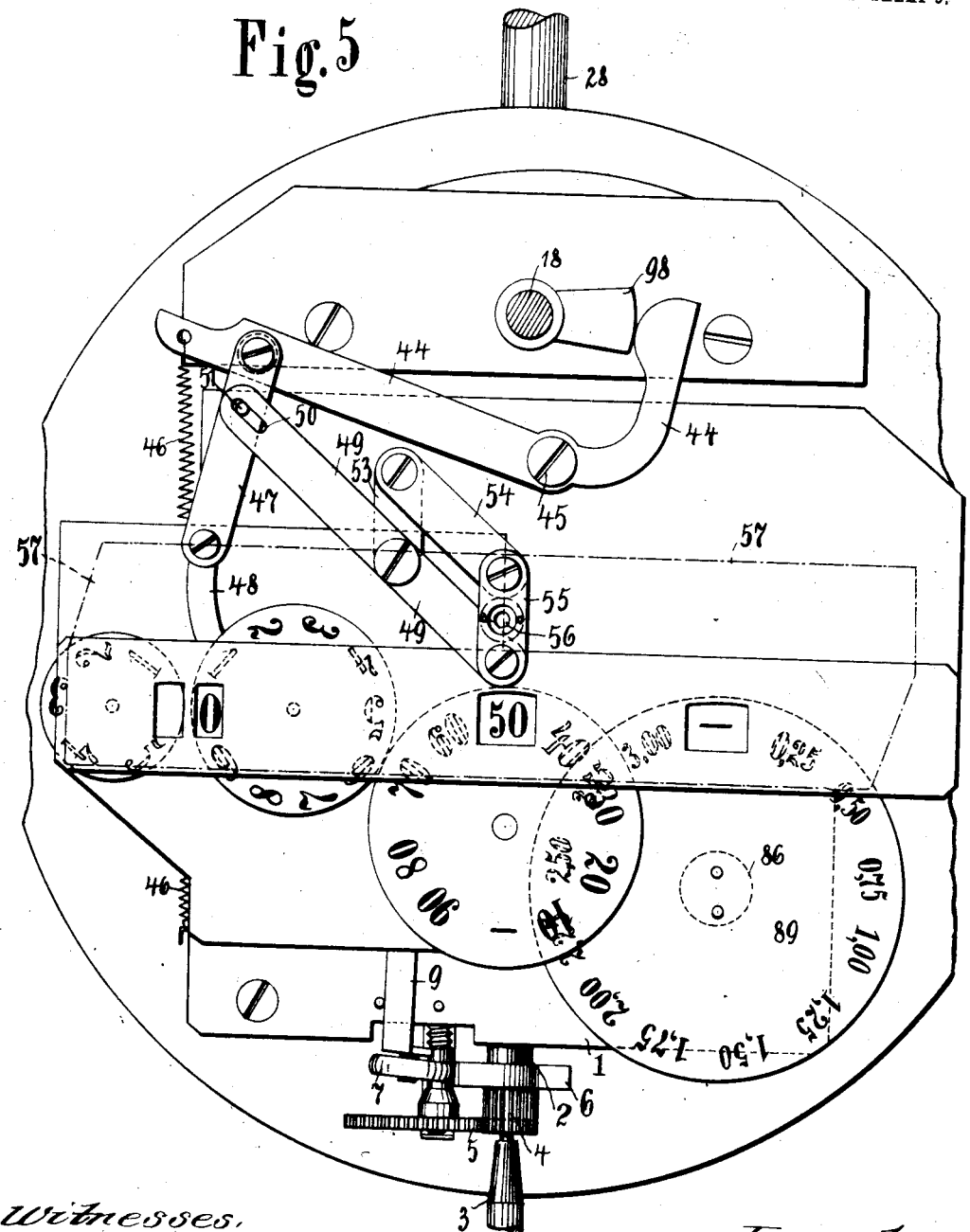
Figure 6:
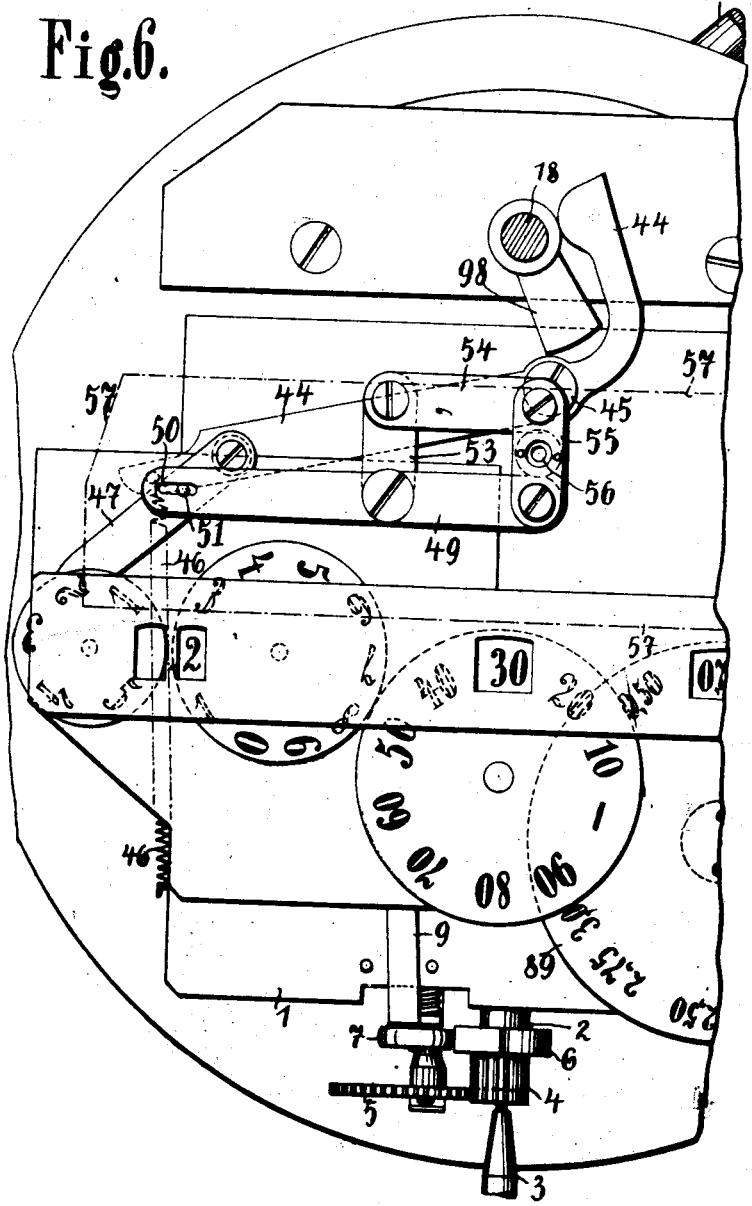

Referring to these drawings:—Figure 1 is a front view of the fare-indicator with its face removed; Fig. 2 is a corresponding side view; Fig. 3 is a view similar to that of Fig. 1, but showing the mechanism in a different position; Fig. 4 is a sectional view corresponding to the line A—B of Fig. 1; Figs. 5 and 6 show in elevation the mechanism by means of which the shield is actuated and the manner in which it is brought into and out of engagement.

Upon the bedplate 1 there is mounted in any suitable manner the main shaft 2 which is positively connected with the flexible shaft 3 driven from the vehicle wheel. Upon the shaft 2 there is keyed a cam disk 6 of the form shown in the sectional view, Fig. 4; on a stud 8 on the bedplate 1 there is pivoted a lever 9 of the first order, the lower end of which carries a roll 7 which is by the action of the spring 10 attached to the upper arm of the lever 9 and is normally maintained within the range of action of the cam disk 6 in such a manner that the roll 7 and with it the lever 9 are by means of the disk 6 alternately moved in opposite directions so as to register the distance traversed in the usual manner on the indicating disk of the odometer. Upon the shaft 2 there is moreover keyed a pinion 4 which is in engagement with a spur wheel 5 the shaft of which carries a worm 19, that gears with a worm wheel 20 on the shaft 21. A pinion 22 also mounted upon the shaft 21 rotates the spur wheel 23, and also the pinion 24 which is in engagement with the spur wheel 25 upon the shaft 36, and which thus actuates the indicating disk 27 mounted upon the last mentioned shaft. The check indicating disk 27 of the odometer being thus positively actuated through spur gearing, the accuracy of its indications is insured.

Against the upper arm of the lever 9 there rests the lower end of a lever of the first order 14 that is pivoted on a stud 13 and the upper end of which is, by means of a spring 15 maintained in contact with the shaft 18 or with a cam 17 rigidly mounted thereon. By means of this engagement, upon the adjustment of the flag to "empty" the lever 9 is caused to assume the position shown in Fig. 1; this being effected through the action of the cam 17, which moves the upper arm of the lever 14 against the action of its spring 15. The roll 7 attached to the lower end of the lever 9 is thus moved out of the range of the cam disk 6, so that the odometer 11ª cannot be actuated by means of the pawl 11 which is mounted on the lever 9 and subject to the action of the spring 12. As soon as the cam 17 releases the upper end of the lever 14, the spring 15 will move the lower end of the lever in the direction indicated by the arrow 16, the roll 7 being thus, under the action of the spring 10, again brought within the range of the cam disk 6 so as to enable the odometer to be actuated in the well-known manner.

Upon the shaft 18, is rigidly attached the flag staff 28 and a hand wheel 37 which facilitates the rotation of the shaft 18. The shaft 18 has also keyed thereon a star wheel 38 provided with obtuse-angled recesses 100, with which a correspondingly obtuse-angled cam 42 on a lever 39 pivoted at 40 is adapted to engage, the lever 39 being constantly maintained in contact with the star wheel 38 by means of a spring 41. The apparatus is adjusted to the correct fare and the like as soon as the cam 42 falls into either of the recesses 100. To prevent the possibility of the apparatus being adjusted to a position intermediate between the first and the second fare, when it ought to be adjusted to the first fare, a maniuplation which hitherto could be easily effected, there are attached to the arms of the star wheel 38 rolls 43 which slide off the oblique faces of the cam 42 on the lever 39 and cause this cam to engage with one of the recesses 100. By this means it is rendered impossible to adjust the apparatus so as fraudulently to indicate fractions of a fare.

The ratchet wheel 29 which is of the usual form, is provided upon its periphery with a recess 30 with which, as soon as the shaft 18 is set to "empty" there engages a pawl 31, pivoted at 32 and subject to the action of a spring 33, while simultaneously a bent lever 34, under the action of a spring 35 likewise engages in the recess 30. The striking of the pawl 31 against the upper edge of the recess 30 prevents the adjustment of the shaft 18 to "fare" accidentally when the vehicle has not started on a journey which must be paid for. Such an accident might, for instance, occur, should the driver's clothing be caught in the flag so as to turn it. Before the apparatus can be set at "fare" it is necessary to rotate the shaft 18 backwards to a small extent, that is to say, towards the left, by means of the flag 28 on the wheel 37. When this is done, one arm of the bent lever 34 will rest against the periphery 36 of the ratchet wheel 29, while its other arm will be pressed against the pawl 3 so as to lift it out of the recess 30 of the ratchet wheel 29. Under the influence of the springs 33 and 35 the parts 31 and 34 will then assume the positions shown in Fig. 3, with the result that the ratchet wheel 29 is released, whereupon the apparatus can be set to the minimum fare.

When the apparatus is adjusted from "cash" to "empty" one arm of the bent lever 34 is carried along by a projection on the circumference of the ratchet wheel 29 and so caused to turn whereby the pawl 31 is released and under the action of the springs 33 and 35 the pawl 31 and the bent lever 34 assume the positions shown in Fig. 1, wherein they lock the ratchet wheel 29.

Upon the shaft 18 there is moreover keyed a cam 98 (Figs. 5 and 6) which by means of suitable intermediate gear raises and lowers the shield that covers the disks indicating the various fares in such manner that this shield covers the fare indicating disks when the apparatus is at rest, but allows them to be visible when the apparatus is in operation. To enable this shield to be moved absolutely level so as to completely cover the indicating disks it is attached to a motion transmitting mechanism arranged in the form of a parallelogram, the construction of which is as follows:— Pivoted on the stud 45 there is a bent lever 44, one end of which is actuated by means of the cam 98 keyed upon the shaft 18 while its other end is under the influence of a spring 46 and has connected with it a link 47 which by means of the lever 48 returns the indicating disks to zero in the usual manner, when the apparatus is put out of engagement. By means of a pin 51 attached to the link 47 and engaging with a slot 50 in the lever 49 the parallel links 49, 53, 54, 55 arranged in the form of a parallelogram can be actuated, the link 53 of the parallelogram remaining stationary, while the links 49, 54 and 55 are movable about their connecting pins. To the link 55 there is attached at 56 a screw or the like for the attachment of the disk 57, which, when the apparatus is out of engagement occupies the position shown in Fig. 5. As soon as the apparatus is set to "fare" the links forming a parallelogram assumes the position shown in Fig. 6, in which the parallelogram has moved upwards, raised the disk, and consequently exposed two indicating disks to view.

Having now particularly described and ascertained the nature of my said invention and in what manner the same is to be performed I declare that what I claim is:

1. A fare-indicator comprising an odometer operating shaft, a cam disk carried thereby, a spring controlled oscillatory lever adapted to have one end engaged by the cam disk causing thereby the actuating of the lever in one direction, an indicating means for the distance which has been traversed and a pawl carried by the other end of the lever and adapted to actuate an indicating means when the lever is shifted in one direction by the cam disk.

2. A fare-indicator comprising an odometer operating shaft, a pinion keyed thereon, a worm-shaft, a spur wheel mounted upon the worm-shaft and adapted to be engaged and actuated by the pinion, an indicating means for checking the distance traversed, a worm-wheel carried by the worm-shaft, and indicating means for registering the distance traversed and an intermediate gear actuated by the worm-wheel for operating said indicating means.

3. A fare-indicator comprising a rotatable flag-shaft, a star-wheel keyed to the flag-shaft and having its periphery provided with obtuse-angled recesses, a spring-controlled lever having an obtuse-angled projection adapted to engage in the recesses of the star-wheel, and rolls carried by the angular portions of the star-wheel and adapted to engage and slide off the angular projection of the lever thereby preventing the adjustment of the apparatus for less than full fares.

4. A fare-indicator comprising the combination with a flag-shaft, of a locking mechanism to prevent the accidental operation of the indicator from its adjusted position indicating "empty" to a position to indicate "fares," said mechanism comprising a ratchet-wheel keyed upon the flag-shaft and provided with a recess, a spring-controlled pawl adapted to engage in the recess when the indicator has been adjusted to indicate "empty," and a spring-controlled bent lever adapted to engage in said recess when the indicator has been adjusted to indicate "empty," said bent lever and pawl when engaging in said recess locking the ratchet-wheel, said bent lever adapted to be shifted out of said recess by a backward movement of the flag-staff, said action further causing the removal of the pawl out of the recess and thereby release the ratchet-wheel.

5. In a fare-indicator the combination with a shield for exposing and concealing the indicating disk, of means for operating the shield, said means consisting of a series of links arranged in the form of a parallelogram, one of said links being stationary and attached to the shield and another of said links extending beyond the parallelogram, a link 47 connected to that link which extends beyond the parallelogram, a bent lever for actuating the link 47, and a cam adapted to engage the bent lever for operating it.

6. A fare-indicator comprising mechanism for returning a fare-indicating disk to zero when the fare indicator is set at "empty" or out of use, said means comprising the combination with the operating means for the indicating disk embodying a shiftable element provided with a stud, of an oscillatory lever adapted when shifted to bear against said stud thereby moving said element to an inoperative position, combined with a pawl to prevent back-lash for said disk, said pawl to prevent back-lash moved to inoperative position simultaneously with the moving of said element to an inoperative position by said lever.

7. A fare-indicator comprising the combination with an indicating disk, of means for arresting the movement of said disk after it has indicated the highest amount it is adapted to indicate, said means comprising a ratchet wheel for actuating the disk, a pawl for shifting the ratchet-wheel, a stop-pin carried thereby, a pawl 91 arranged in the path of said stop-pin for arresting the movement of the ratchet-wheel when the pin abuts against the pawl, said pawl 91 when engaged by said stop-pin adapted to be forced against the pawl 70 and lock it, and means for releasing the pawl 70 to allow of the disk being returned to zero position.

8. A fare indicator comprising a rotatable flag shaft, a rotatable element carried thereby and having a plurality of recesses, a spring controlled member provided with a projection adapted to engage in said recesses, and rotatable members carried by said element and adapted to engage and slide off the projection of said spring controlled member, thereby preventing the adjustment of the apparatus for less than full fare.

9. A fare indicator comprising a rotatable flag shaft, a rotatable member carried thereby and having a plurality of recesses, a shiftable element provided with a projection adapted to engage in said recesses, and rotatable elements carried by said member and adapted to engage and slide off the projection of said shiftable element, thereby preventing the adjustment of the apparatus for less than full fare.

10. A fare indicator comprising the combination of a flag shaft, of a locking mechanism to prevent the accidental operation of the indicator from its adjusted position indicating "empty" to a position to indicate "fares", said mechanism comprising a rotatable member carried by the flag shaft and provided with a recess, a pair of locking elements engaging said recess when the indicator has been adjusted to indicate "empty", thereby locking said member, one of said elements adapted to be shifted out of said recess by a backward movement of the flag shaft, said action further causing the removal of the other of said elements out of the recess, thereby releasing the said member.

11. An indicator comprising a fare indicating mechanism, a flag staff connected thereto and adapted when shifted to actuate said mechanism to indicate the payment of a fare, a recess member connected with said staff, and a duplex means engaging in said member and adapted to prevent the actuation of said mechanism to indicate payment of fare when said flag staff is accidentally shifted.

12. An indicator comprising means for measuring the total distance traversed, operating means therefor, means for registering the actual distance traversed to constitute a check, means actuated from said operating means for operating the registering means, a fare indicating means, a flag staff connected thereto and adapted when shifted to actuate said mechanism to indicate the payment of a fare, and means to prevent the actuation of said mechanism to indicate payment of fare when said flag staff is accidentally shifted.

13. In an indicator comprising means for measuring the total distance traversed, operating means therefor, means for registering the actual distance traversed to constitute a check, means actuated from said operating means for operating the registering means, a fare indicating mechanism, a flag staff connected thereto and adapted when shifted to actuate said mechanism to indicate the payment of a fare, and means whereby the actuation of said mechanism is prevented for indicating other than full fare.

14. An indicator comprising means for measuring the total distance traversed, operating means therefor, means for registering the actual distance traversed to constitute a check, means actuated from said operating means for operating the registering means, a fare indicating mechanism, a flag staff connected thereto and adapted when shifted to actuate said mechanism to indicate the payment of a fare, means whereby the actuation of said mechanism is prevented for indicating other than full fare, and means whereby the actuation of said mechanism is prevented to indicate payment of fare when the flag staff is accidentally shifted.

15. An indicator for vehicles comprising an operating shaft, a cam disk and a pinion carried by said shaft, an indicator mechanism, a lever mechanism actuated by said cam disk for operating said indicating mechanism, a registering disk, means actuated by said pinion for operating the said disk, and means driven from a moving part of the vehicle and connected with said shaft for operating it.

In testimony whereof I have hereunto set my hand in presence of two subscribing witnesses.

BERTHOLD SCHNEIDER.

Witnesses:
 WOLDEMAR HAUPT,
 ADOLF WALL.